United States Patent [19]

Lyles

[11] 4,118,928
[45] Oct. 10, 1978

[54] MEANS FOR MOUNTING SOLID PROPELLANT IN A ROCKET MOTOR

[75] Inventor: Bobby J. Lyles, Yardley, Pa.

[73] Assignee: Thiokol Corporation, Newtown, Pa.

[21] Appl. No.: 378,739

[22] Filed: Jul. 12, 1973

[51] Int. Cl.² .............................................. F02K 9/04
[52] U.S. Cl. ..................................................... 60/255
[58] Field of Search .............. 60/39.47, 255; 102/101, 102/103; 86/1, 20 R

[56] References Cited
U.S. PATENT DOCUMENTS

| 3,362,159 | 1/1968 | Heesacker | 60/39.47 |
| 3,426,528 | 2/1969 | Mangum et al. | 60/39.47 |
| 3,724,219 | 4/1973 | Allard et al. | 60/255 |

Primary Examiner—Samuel Feinberg

Attorney, Agent, or Firm—Stanley A. Marcus; William R. Wright, Jr.

[57] ABSTRACT

A solid propellant grain is held within a rocket motor case in a substantially stress-free manner. The grain is not bonded to the case itself but is bonded to a sleeve which has lateral protrusions or convolutions on its exterior which fit loosely and unattached into similar convolutions in a sleeve bonded to the interior of the case. The sleeve bonded to the propellant is made of a polymer having substantiallythe same elastomeric qualities as the propellant itself so that stresses are not created in the propellant at the bond. Physical shock or distortion of the propellant and thermal expansion or contraction of it create changes in dimension which are absorbed principally by the clearance gap between the convoluted surfaces of the sleeves and therefore substantially no cracking stresses are produced in the propellant itself.

6 Claims, 6 Drawing Figures

MEANS FOR MOUNTING SOLID PROPELLANT IN A ROCKET MOTOR

BACKGROUND OF THE INVENTION

One of the problems associated with solid propellant rocket motors is that of stresses produced in the propellant where it is normally bonded to the inner wall of the motor case. The stresses can be induced by physical shock loading, cure shrinkage, and temperature changes in the propellant or combustion caviety. Stresses from any of these sources can cause cracks and fissures in the propellant which can cause unusually high burning rates due to the increased burning area with possible resulting catastrophic failure and explosion or at the least excessive and uncontrolled thrust output.

This problem has long been recognized in the art and various solutions have been offered all of which have various shortcomings such as increased weight, difficulty in building and assembling the motor, and excessive number of parts adding to the expense and complexity of the motor, and propellant attachment mounts or fittings which may produce excessive local stresses in the propellant.

OBJECTS OF THE INVENTION

Accordingly, it is an object of the present invention to provide a mount for a solid propellant in a rocket motor case in which the propellant is not bonded nor attached directly to the case itself at any point and thus damaging stresses are not developed between it and the case which would be detrimental to the propellant.

It is also an object of the present invention to provide a propellant to rocket motor case mount of the foregoing type which is convenient and simple to build and assemble and should be less expensive and reasonably light in weight.

Other objects and advantages of the present invention will become apparent from the drawings and detailed description which follow herein.

DESCRIPTION OF THE INVENTION

Figure 1:
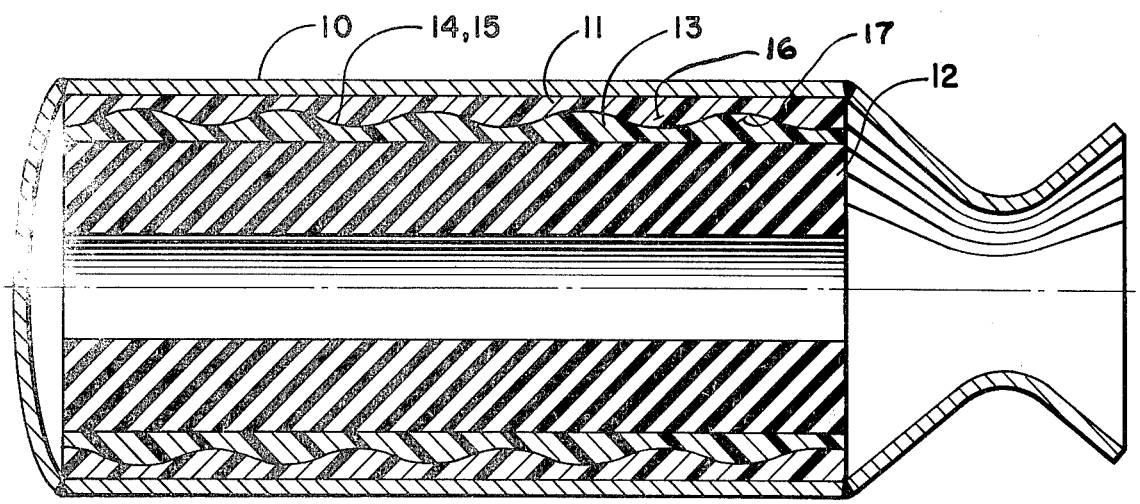
FIG. 1 is a cross-sectional view of a rocket motor showing a solid propellant mounted therein in accordance with a preferred embodiment of the present invention.
Figure 2:
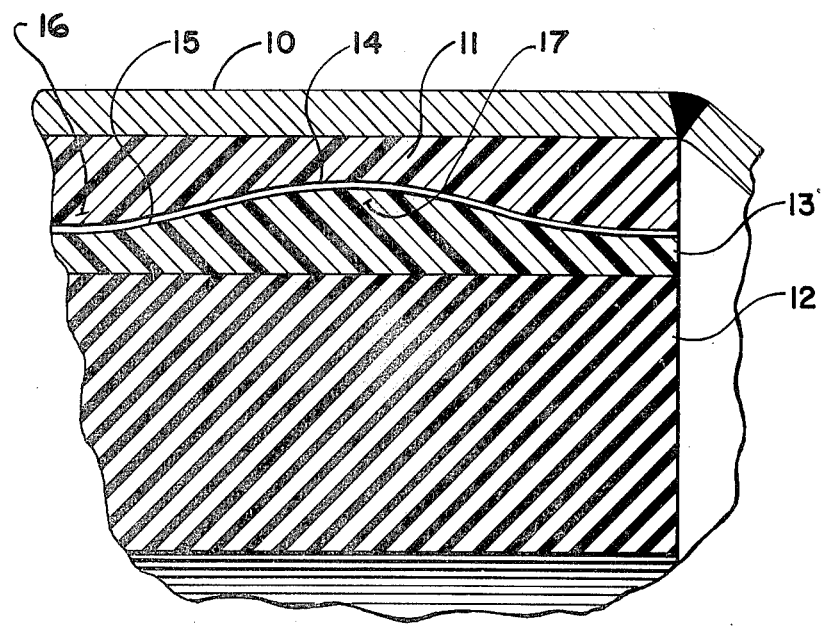
FIG. 2 is a partial cutaway cross-sectional longitudinal view similar to that in FIG. 1 but enlarged.

In a preferred embodiment and with reference to FIG. 1, a solid propellant rocket motor is shown having a case 10 and a sleeve 11 contained within it, with the inner wall of case 10 and the outer wall of sleeve 11 bonded firmly together. Solid propellant grain 12, however, is surrounded on its lateral generally cylindrical surface by propellant sleeve 13 which is firmly bonded to the propellant 12 but is not attached to the case sleeve 11. The inner surface of case sleeve 11 is formed into one or more annular protrusions or convolutions 16 which are configured preferably in a sinusoidal curve in longitudinal cross-sectional profile of gentle slope at its steepest point to substantially match and fit between, in mating fashion, similar protrusions or convolutions 17 formed into the outer surface of propellant sleeve 13 substantially in the manner shown in FIG. 1. Both the first or outer sleeve 11 and the second or inner sleeve 13 are made of a polymer having thermal expansion characteristics which are similar to those of the solid propellant itself. This is of particular importance with respect to sleeve 13 because of its bonded direct attachment to the propellant 12 at their interface and because of the fact that otherwise serious thermal stresses could be produced in the propellant at that location just as would be the situation if the propellant was bonded directly to the motor case 10 itself. A material such as polyisoprene or the like should be suitable for this purpose for both sleeves 11 and 13 since its thermal expansion characteristics are similar enough to those of the propellant to preclude the formation of thermally induced stresses of any consequence. The propellant shown is of the hollow center type but could be of the end burning type for the purposes of this invention.

The propellant 12 is first formed into the usual hollow cylindrical form (for a hollow center internal burning motor) and is then slipped into sleeve 13 and heat bonded thereto. Outer sleeve 11 is split longitudinally into halves which are then placed over sleeve 13 with the protrusions 16, 17 of the sleeves fitted together in a loosely meshed, overlapping or mating fashion as shown in FIG. 1. The two halves are then bonded together at the splits but the two sleeves remain completely unattached to one another although they are restrained from longitudinal relative motion, except for a slight clearance, by the interference between the protrusions and the recesses 16, 17. The whole assembly is then slid into the open rocket thrust chamber case 10 from the head end or aft end and sleeve 11 is then bonded directly to the inner wall of case 10 after which the head or aft end of case 10 is fastened in place by welding or other suitable means. The clearance gap between the surfaces 14, 15 must be not less then that which is sufficient to substantially absorb the change in size of the propellant grain so that no stresses of any consequence are produced therein.

A mold release material, such as polytetrafluoroethylene is applied to the interfaces 14, 15 of sleeves 11, 13 or 11a, 13a so that no bonding of these to one another can occur at any time during the assembly of the motor or during its operation.

Figure 3:
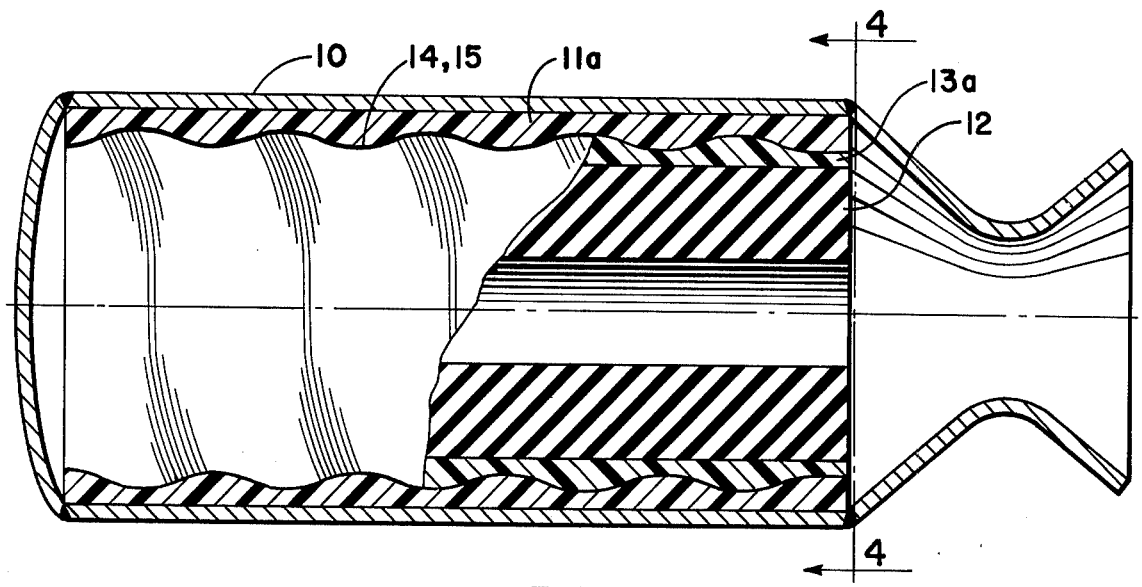
FIG. 3 is a partial cutaway and partially longitudinal cross-section of the rocket motor showing the protruding and receiving portions or convolutions in the longitudinal cross-sectional profile form of a screw thread.
Figure 4:
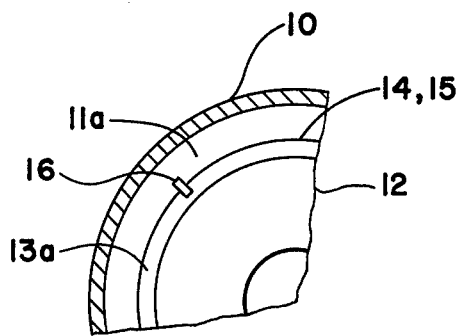
FIG. 4 is a lateral partial cross-sectional view of a rocket motor showing a stop key to prevent unscrewing of the propellant from the case.

In another embodiment of the same invention, the protrusions and their corresponding recesses can be made in the form of similar helices to provide a screw thread as shown in FIG. 3. With this arrangement the sleeves are first bonded in place on the propellant and then the propellant and its attached sleeve 13a are simply screwed all the way into the chamber case, with a clearance gap provided between the sleeves as described above. The propellant is not apt to become "unscrewed", but a stop key can be inserted with a push fit in suitable corresponding keyway slots in the two sleeves as shown in FIG. 4 to bridge the clearance gap in order to prevent relative rotary motion between them and consequent unscrewing of the propellant and its sleeve.

Figure 5:
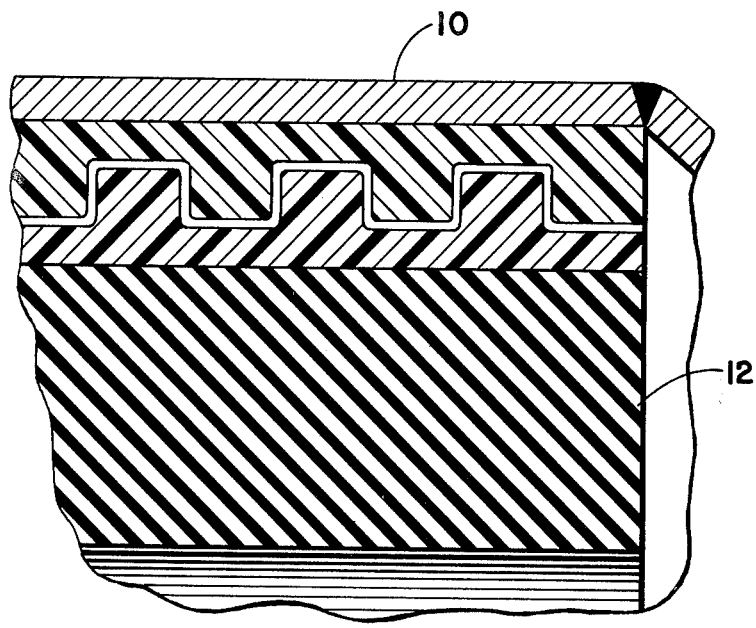
FIG. 5 is a partial cutaway and partially longitudinal cross-section of the rocket motor showing the protruding and receiving portions or convolutions in the longitudinal cross-sectional profile form of a rectangle or square tooth.
Figure 6:
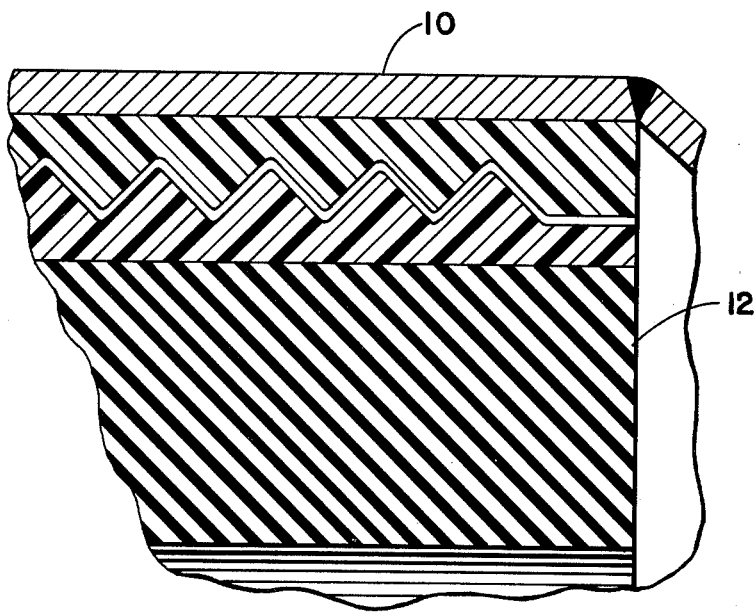
FIG. 6 is a partial cutaway and partially longitudinal cross-section of the rocket motor showing the protruding and receiving portions or convolutions in the longitudinal cross-sectional profile form of a saw tooth.

While the sinusoidal form of the annular protrusions and recesses is preferable because of the slight sliding effect which may occur, other forms or profiles for these convolutions could be used such as the square tooth or rectangular form shown in FIG. 5 and the saw tooth or triangular form shown in FIG. 6. These would operate in the same general manner as would the sinusoidally profiled convolutions but no sliding could take place in the square tooth form at the vertical faces and only very slight sliding could occur with the triangularly profiled convolutions.

OPERATION OF THE INVENTION

It will be seen that when the propellant temperature changes, the temperature of the propellant rises or falls not only at its surface but progressively throughout its thickness until it rises at the propellant's outer surface as well. This rise or fall in temperature is accompanied by thermal expansion or contraction of the propellant which is greatest in the direction of the motor's longer longitudinal axis although some radial expansion is produced as well. As these expansions or contractions occur and the physical dimensions of the propellant are changed accordingly, any restraint of the propellant will produce a stress in the propellant in the vicinity of the restraint which the propellant itself is forced to absorb internally and such stresses can be sufficient to crack or split the propellant and burning can take place along the split. Since more area of propellant is therefore exposed during burning, the pressure produced in the rocket motor is increased over what is normal and this excessive pressure may cause an explosion or, at least, an uncontrolled and undesirable pressure rise resulting in excessive thrust when it is not programmed and is unexpected. With the present invention, however, as embodied in the structures previously described herein, radial expansions and contractions are allowed by the interfacial clearance at 14, 15 between the sleeves, and, the longitudinal expansions or contractions are accommodated principally by clearance in that direction and by very slight sliding of the interfaces at the easy slopes of the sinusoidal curvatures where that form is employed. Thus, the propellant 12 and its attached sleeve 13 or 13a while restrained sufficiently to prevent it from falling out of the case 10 is, in essence, floating and unattached in its position therein, and any stresses produced due to thermal expansion are not of sufficient consequence to cause cracking of the propellant. As a result the possibility of dangerous damage to the motor is greatly reduced.

It will also be seen that stresses in the propellant which might otherwise occur during the curing process or be induced by physical or thermal shock during handling, storing or shipping will be minimized with the result that cracks are most unlikely to be present in the propellant at the time it is to be burned thus further reducing the possibility of dangerous damage.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore to be limited only as indicated by the scope of the following claims.

What is claimed is:

1. In a rocket motor containing a solid propellant, a thrust chamber case having an annular inner wall, an annular first sleeve having an outer wall bonded to the inner wall of the case and an inner wall having at least one convolution, an annular second sleeve having an inner wall bonded to the solid propellant and an outer wall having at least one convolution which matches that of the first sleeve with the convolutions of each meshed but unattached throughout the propellant's length and spaced therefrom by a clearance gap, and the material of the second sleeve being polyisoprene.

2. In a rocket motor containing a solid propellant, a thrust chamber case having an annular inner wall, an annular first sleeve having an outer wall bonded to the inner wall of the case and an inner wall having at least one convolution, an annular second sleeve having an inner wall bonded to the solid propellant and an outer wall having at least one convolution which matches that of the first sleeve with the convolutions of each meshed but unattached throughout the propellant's length and spaced therefrom by a clearance gap, and the convolutions sinusoidal in longitudinal cross sectional profile.

3. In a rocket motor containing a solid propellant, a thrust chamber case having an annular inner wall, an annular first sleeve having an outer wall bonded to the inner wall of the case and an inner wall having at least one convolution, an annular second sleeve having an inner wall bonded to the solid propellant and an outer wall having at least one convolution which matches that of the first sleeve with the convolutions of each meshed but unattached throughout the propellant's length and spaced therefrom by a clearance gap, and the convolutions in a saw tooth longitudinal cross sectional profile.

4. In a rocket motor containing a solid propellant, a thrust chamber case having an annular inner wall, an annular first sleeve having an outer wall bonded to the inner wall of the case and an inner wall having at least one convolution, an annular second sleeve having an inner wall bonded to the solid propellant and an outer wall having at least one convolution which matches that of the first sleeve with the convolutions of each meshed but unattached throughout the propellant's length and spaced therefrom by a clearance gap, and the convolutions in a square tooth longitudinal cross sectional profile.

5. In a rocket motor containing a solid propellant, a thrust chamber case having an annular inner wall, an annular first sleeve having an outer wall bonded to the inner wall of the case and an inner wall having at least one convolution, an annular second sleeve having an inner wall bonded to the solid propellant and an outer wall having at least one convolution which matches that of the first sleeve with the convolutions of each meshed but unattached throughout the propellant's length and spaced therefrom by a clearance gap, and the convolutions in the sleeves in the form of similar helicies of constant pitch to form a mating screw thread.

6. The invention set forth in claim 5 with a stop key inserted in keyway slots in both the first and second sleeves and bridging the gap, whereby relative rotation between the first and second sleeves is prevented.

* * * * *